(12) United States Patent
Coksen et al.

(10) Patent No.: US 11,629,612 B2
(45) Date of Patent: Apr. 18, 2023

(54) SYSTEM FOR FEEDING OPERATING GAS TO A DRIVE OF A MOTOR VEHICLE

(71) Applicant: BorgWarner Inc., Auburn Hills, MI (US)

(72) Inventors: Ahmet Coksen, Mannheim (DE); Mathias Kosch, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/237,121

(22) Filed: Apr. 22, 2021

(65) Prior Publication Data

US 2021/0332716 A1    Oct. 28, 2021

(30) Foreign Application Priority Data

Apr. 24, 2020  (DE) .......................... 102020205238.7

(51) Int. Cl.
  *F01D 17/14* (2006.01)
  *F01D 15/10* (2006.01)
  (Continued)

(52) U.S. Cl.
  CPC ........... *F01D 17/145* (2013.01); *F01D 15/10* (2013.01); *F02C 6/12* (2013.01);
  (Continued)

(58) Field of Classification Search
  CPC .......... F01D 15/10; F01D 17/145; F01D 1/30; F02B 39/10; F02C 6/12; F05D 2220/40;
  (Continued)

(56) References Cited

U.S. PATENT DOCUMENTS 9,581,095 B2 *  2/2017  Pursifull ........... F02M 35/10222
10,513,972 B2 * 12/2019  Ehrhard .................. F02B 37/14
(Continued)

FOREIGN PATENT DOCUMENTS

DE   602004000194 T2   8/2006
DE   202017107685 U1   1/2018

OTHER PUBLICATIONS

English language abstract and machine-assisted English translation for DE 60 2004 000 194 T2 extracted from espacenet.com database on May 3, 2021, 12 pages.
(Continued)

*Primary Examiner* — Jesse S Bogue
(74) *Attorney, Agent, or Firm* — Howard & Howard Attorneys PLLC

(57) ABSTRACT

A system for feeding operating gas to a drive (1) of a motor vehicle, including an atmosphere-side suction inlet (2a) for air under atmospheric pressure, and a feed line (2) for the operating gas to the drive (1) under an operating pressure, the operating gas which is conducted to the drive comprising at least part of the air which is sucked in, at least part of the operating gas being conducted through a turbomachine (3) upstream of the drive (1) in a first operating type, the turbomachine (3) comprising an electric generator (4), and the turbomachine (3) being operated in a second operating type as a compressor for the operating gas, an actuable valve arrangement (5) being provided, at least part of the air which is sucked in being conducted in a turbine direction (T) through the turbomachine (3) in a first position of the valve arrangement (5), and at least part of the air which is sucked in being conducted in a reversed compressor direction (V) through the turbomachine (3) in a second position of the valve arrangement (5).

8 Claims, 3 Drawing Sheets

(51) Int. Cl.
  *F02C 6/12* (2006.01)
  *F02M 35/10* (2006.01)
(52) U.S. Cl.
  CPC ............ *F02M 35/10006* (2013.01); *F02M 35/10255* (2013.01); *F05D 2220/40* (2013.01); *F05D 2220/76* (2013.01); *F05D 2240/12* (2013.01); *F05D 2270/3015* (2013.01)
(58) Field of Classification Search
  CPC ............ F05D 2220/76; F05D 2240/12; F05D 2270/3015; Y02T 10/12
  See application file for complete search history.

(56) References Cited

U.S. PATENT DOCUMENTS

| | | | | |
|---|---|---|---|---|
| 10,526,955 B2* | 1/2020 | Ehrhard | ............... | F02B 37/162 |
| 10,563,572 B2* | 2/2020 | Zhang | ............... | F02B 37/005 |
| 11,035,312 B2* | 6/2021 | Oh | ............... | F02B 37/12 |
| 2002/0046743 A1* | 4/2002 | Moren | ............... | F01M 13/023 |
| | | | | 123/572 |
| 2006/0207253 A1* | 9/2006 | Sumser | ............... | F02B 37/12 |
| | | | | 60/602 |
| 2007/0204615 A1* | 9/2007 | Vrbas | ............... | F02B 37/013 |
| | | | | 60/605.1 |
| 2016/0195047 A1* | 7/2016 | Carter | ............... | F02B 39/10 |
| | | | | 60/605.1 |
| 2018/0252140 A1* | 9/2018 | Mandausch | ...... | F02M 35/10386 |

OTHER PUBLICATIONS

Machine-assisted English language abstract and machine-assisted English translation for DE 20 2017 107 685 U1 extracted from espacenet.com database on May 3, 2021, 14 pages.

* cited by examiner

SYSTEM FOR FEEDING OPERATING GAS TO A DRIVE OF A MOTOR VEHICLE

CROSS REFERENCE TO RELATED APPLICATIONS

The present application claims priority to and all the benefits of German Patent Application No. DE102020205238.7, filed Apr. 24, 2020, the disclosure of which is hereby incorporated herein by reference in its entirety.

TECHNICAL FIELD

The invention relates to a system for feeding operating gas to a drive of a motor vehicle.

BACKGROUND

DE 60 2004 000 194 T2 describes an internal combustion engine with an exhaust gas turbocharger, a second turbocharger being provided as a further component. On one shaft, the second turbocharger comprises a turbine which can be loaded with fresh air, a compressor and an electric drive. Both the turbine and the separate compressor are flowed through in the same flow direction at all times here.

DE 20 2017 107 685 U1 describes an internal combustion engine with an exhaust gas turbocharger, an expander being provided as a further component. The expander is used to expand fresh air which has previously been supercharged to an excessive extent in the exhaust gas turbocharger, and to cool it as a result. Here, the expander can be coupled to an electric generator.

It is the object of the invention to specify a system for feeding operating gas to a drive of a motor vehicle, in the case of which system an overall degree of efficiency is improved by way of simple means.

SUMMARY OF THE INVENTION

According to the invention, said object is achieved for a system mentioned at the outset by way of the characterizing features of claim 1. Flexible operation with a small amount of components can take place by way of the actuable valve arrangement, the air which is sucked in being conducted in a turbine direction through the turbomachine in a first position of the valve arrangement, and the air which is sucked in being conducted in a reversed compressor direction through the turbomachine in a second position of the valve arrangement. As a whole, the degree of efficiency of the drive can be improved as a result.

In the context of the invention, the operating gas is understood to mean any gas or gas mixture which is fed to the drive for the conversion of energy. Depending on the arrangement of the system, the operating gas can be pure air, an air/exhaust gas mixture or some other mixture of the air which is sucked in with further constituent parts. The operating gas can generally preferably be identical to the air which is sucked in. Here, the operating pressure is the pressure, at which the operating gas is fed directly to the drive.

In the context of the invention, a turbomachine is any machine which removes energy from the operating gas by way of energy conversion, in particular in the manner of a turbine, and/or feeds energy to the operating gas, in particular in the manner of a compressor.

If the operating gas flows here in the turbine direction in the first operating type, energy from the operating gas is as a rule converted into mechanical energy which can be converted into further energy forms which can be utilized and which increase the overall degree of efficiency. In this operating type, the turbomachine is preferably used as an expander for the operating gas, electric energy being obtained or recuperated by means of the generator. Here, the operating gas is expanded in accordance with a pressure gradient which prevails across the turbomachine. Cooling or a temperature reduction of the operating gas occurs as a rule in the case of the expansion of the operating gas. In the context of the present invention, free operating parameters are selected in such a way that the generation of electric energy is optimized and has precedence over possible cooling of the operating gas by way of the turbomachine.

In the context of the invention, an actuable valve arrangement is any arrangement of one or more valves which can be adjusted by way of a controller and makes an adjustment of the operating gas stream between at least two operating types possible.

The drive can generally be a sole or else supplementary drive of the motor vehicle. Examples are internal combustion engines for direct drive, a hybrid drive with an additional electric motor, or as a range extender for an electric motor as drive. The internal combustion engine is particularly preferably a gasoline engine. Fuel cells are fundamentally also understood to be drives in the context of the invention, a feed of operating gas to the fuel cell being assisted by means of the compressor. Depending on the operating conditions and load changes, pressure gradients can also occur here in the operating gas, which pressure gradients allow a recuperation or energy generation from the operating gas by means of the turbomachine.

In the case of one preferred embodiment of the invention, the rotational direction of the electric generator runs in an opposed manner in the two operating types. This allows a simple realization, in particular by way of attachment of the generator and a compressor wheel and/or turbine wheel on the same shaft. In the case of alternative embodiments, however, a reversing gear mechanism might also be provided, with the result that the generator or motor always rotates in the same direction. As a result, a torque in the case of a change of the operating type can be decreased.

The generator is generally advantageously switched as an electric motor of the turbomachine by means of control electronics in the second operating type. This allows the use of the same moving masses as a generator and as a motor. In the case of alternative embodiments, however, a separate motor and generator might also be provided, preferably on the same shaft.

In order to reduce the number of components and in the interests of a compact overall design, the valve arrangement can generally advantageously comprise a multiway valve. The valve arrangement particularly preferably consists completely of a multiway valve. A particularly advantageous multiway valve comprises only a single valve slide, by way of which the flow paths of the various operating types are achieved.

Depending on the operating type, the valve arrangement can also act as a throttle valve with an adjustable cross section for the air mass regulation of the drive.

The turbomachine generally advantageously comprises precisely one turbomachine wheel, the wheel acting as a turbine or as a compressor for the operating gas depending on the operating type. This allows inexpensive and simple production. In the case of alternative embodiments, however, a plurality of wheels can also be provided. For example, said wheels can be flowed through one after another, in order, for example, to increase the turbomachine efficiency. Depending on the requirements, only the throughflow of one of the wheels can also be provided in one of the operating types, for example the first operating type, whereas two or more wheels are flowed through in the second operating type.

In the case of a simple and generally preferred realization of the invention, the turbomachine comprises a turbine of radial design. Turbines of this type can be optimized satisfactorily, in particular, in conjunction with internal combustion engines.

For the turbomachine optimization, it can generally advantageously be provided that the turbomachine has stationary guide vanes. Guide vanes of this type can be produced inexpensively and allow an increase of the efficiency.

As an alternative to this, it can be provided that the turbomachine comprises adjustable guide vanes. This allows particularly satisfactory optimization of the efficiency. As a result, in particular, the adaptation to the various operating modes can be improved, since various pressures, mass flow target values and flow velocities are often present here.

It is provided in the case of one particularly preferred embodiment of the invention that the drive is configured as an internal combustion engine. In many operating states, for example in part load operation, in particular, internal combustion engines have a pressure difference of the intake manifold, which is suitable for turbomachine recuperation. An electrically driven compressor (known, for example, under the designation "eBOOSTER") is frequently already used, in order to compress the air or the operating gas which is sucked in to a higher pressure level. According to the invention, a module of this type can at the same time be used in conjunction with the valve arrangement as a turbine for recuperation. To this end, at most minor modifications are required. These relate firstly to the electronic circuitry which, in addition to motor operation, also makes generator operation possible. Depending on the requirements, an optimization and/or adjustability of components which are relevant to the turbomachine (compressor wheel, turbine wheel and their guide apparatuses) can also take place, in order to operate in each case efficiently in the various operating modes.

Here, in one preferred development, an exhaust gas turbocharger can be provided in addition to the turbomachine. The exhaust gas turbocharger makes an optimization of the degree of efficiency of the overall system possible, by utilizing energy which is contained in the exhaust gas and supercharging the internal combustion engine. Here, the exhaust gas turbocharger is preferably a separate component with a dedicated turbine wheel and compressor wheel.

In one embodiment of the invention which is an alternative to the above, no further compressor, in particular no further exhaust gas turbocharger, is provided in addition to the turbomachine. This allows cost savings and a reduction of components. Here, the turbomachine can fundamentally act as an electrically driven compressor or supercharger which acts permanently in load operation. As an alternative, the turbomachine can also operate merely temporarily as a supercharger, in order to make short peak loads possible, for example in the case of acceleration, with the result that the internal combustion engine is operated as a normally aspirated engine in the case of normal load. The design of a system of this type can be adapted depending on requirements.

It is provided in the case of a further possible embodiment of the invention that the turbomachine comprises a turbine wheel which is driven by way of exhaust gas of the internal combustion engine. The exhaust gas turbine wheel can be arranged here on the same shaft as the generator. In the simplest structural variant, the turbomachine therefore comprises an operating gas-side wheel which, depending on the operating type, is flowed through as an operating gas-side compressor wheel or operating gas-side turbine wheel, an electric motor which, depending on the operating type, can also be operated as an electric generator, and an exhaust gas-side turbine wheel. Said components can all be arranged on the same shaft.

It is then to be taken into consideration in the first operating type that the exhaust gas-side turbine wheel does not have a braking effect on the turbomachine. To this end, the exhaust gas-side turbine wheel can be switched to be free of flow or to idle outside the exhaust gas stream. As an alternative or in addition, a releasable clutch can be provided on a common shaft. Once again as an alternative or in addition, a reversing gear mechanism can be provided. For example, the generator or motor and the exhaust gas-side turbine wheel can always rotate in the same direction by means of the reversing gear mechanism, whereas only the rotational direction of an operating gas-side compressor wheel/turbine wheel reverses depending on the operating type.

In the context of the invention, it can generally advantageously be provided that the operating pressure in at least one regular operating state, preferably a part load range of the drive, is smaller by a differential pressure than the atmospheric pressure. This allows, for example, operation as a normally aspirated engine or else operation in conjunction with an exhaust gas turbocharger in the case of a low power output. In the case of a design of this type of the system, the turbomachine in the first operating type is designed in such a way that there is a satisfactory efficiency for a pressure gradient toward a subatmospheric pressure on the outlet side of the turbomachine in turbine operation.

Further advantages and features of the invention result from the exemplary embodiments which are described in the following text, and from the dependent claims.

In the following text, a plurality of preferred exemplary embodiments of the invention will be described and will be explained in greater detail on the basis of the appended drawings.

DETAILED DESCRIPTION

Figure 1:
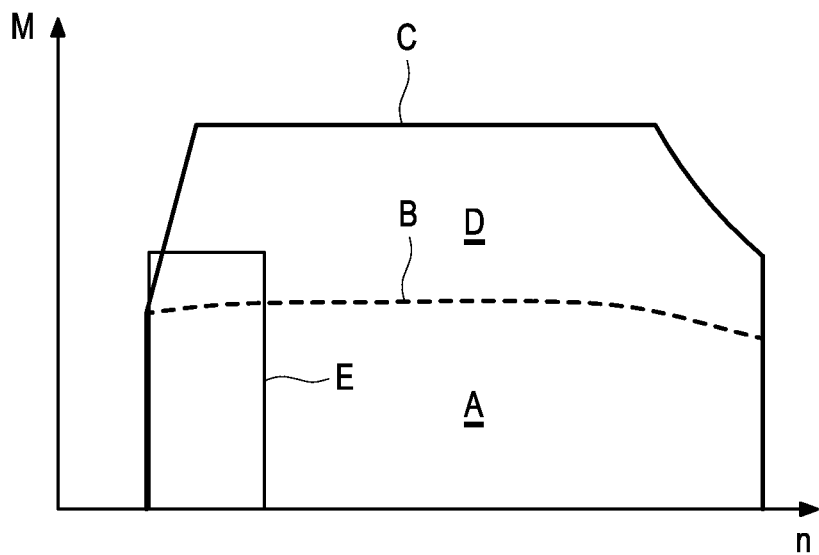
FIG. 1 shows a general diagram for operating states of an internal combustion engine which can be supercharged.

The diagram which is shown in FIG. 1 generally describes operating states of a drive for a motor vehicle in the form of an internal combustion engine 1, in the case of which the operating gas can be supercharged via a compressor. Here, the torque M of the internal combustion engine 1 is plotted against the engine rotational speed n.

The range A corresponds to a normally aspirated operation of the engine 1, in the case of which the compressor is not in operation at all or is in operation only with a small power output. Here, a mass flow of the operating gas is regulated via a throttle valve. The operating gas pressure on the inlet side of the internal combustion engine 1 lies below atmospheric pressure. Atmospheric pressure is the outside air pressure, at which external air is sucked in by way of the system as a main constituent part of the operating gas.

The dashed line B characterizes, as upper torque limit of the range A, the curve of maximum power output of the internal combustion engine 1 in normally aspirated operation.

The range D corresponds to supercharged operation of the internal combustion engine 1, in the case of which the compressor increases the pressure of the operating gas. Accordingly, the mass flow of the operating gas is defined by way of the power output of the compressor. In the normal case, no use of the throttle valve takes place in this range.

The line C characterizes, as upper torque limit of the range D, the curve of maximum power output of the internal combustion engine 1 in supercharged operation.

The range E which is plotted as a rectangle shows the operating range which is primarily relevant to the present invention. This is the operation at part load and a low engine rotational speed. In said range E, there is a pressure gradient in the inlet-side operating gas stream, which pressure gradient can be utilized for the expansion of the operating gas and recuperation of energy, the overall degree of efficiency of the engine 1 being increased.

Figure 3:
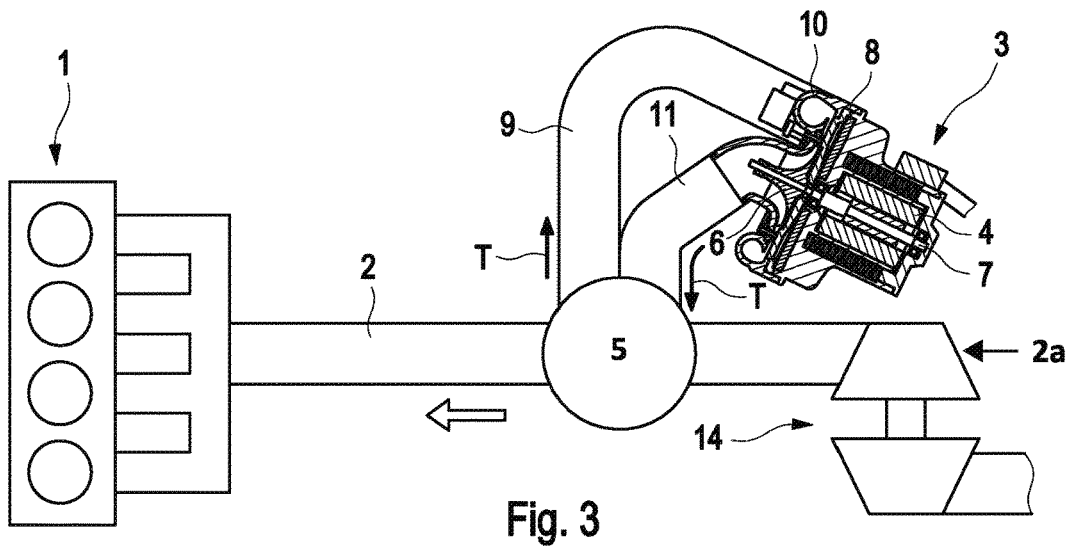
FIG. 3 shows a diagrammatic view of a system according to the invention for feeding operating gas to a drive of a motor vehicle in a first operating state.
Figure 4:
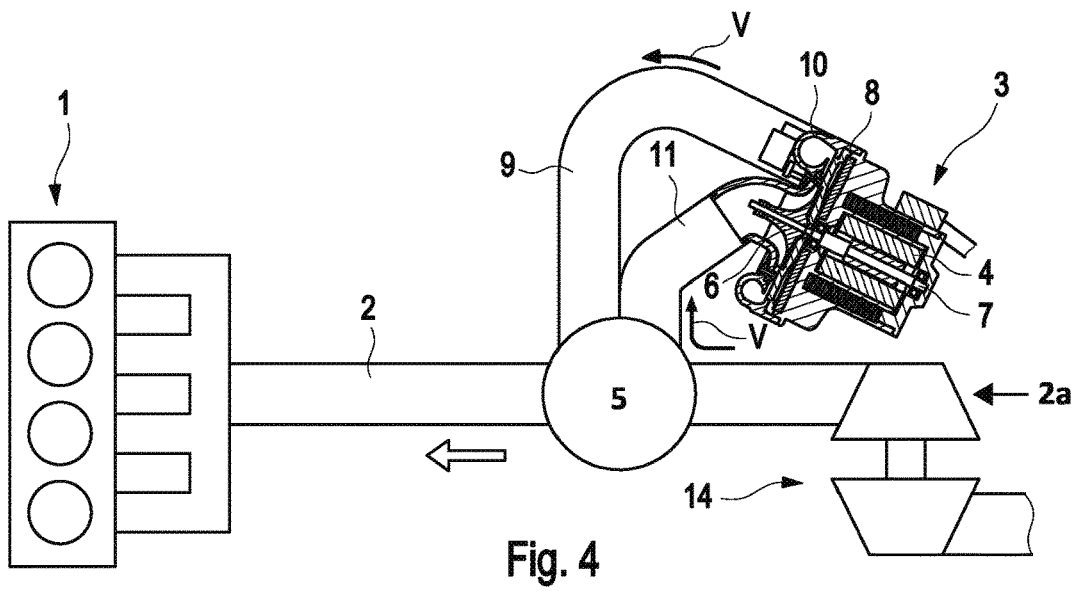
FIG. 4 shows the system from FIG. 3 in a second operating state.
Figure 5:
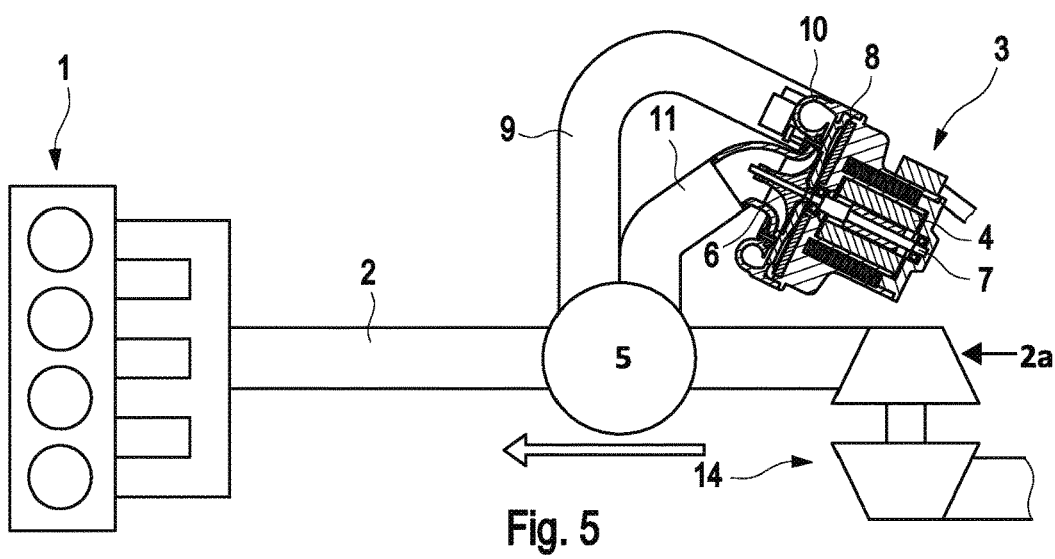
FIG. 5 shows the system from FIG. 3 in a third operating state.

FIG. 3 to FIG. 5 in each case show a system for feeding operating gas to a drive in the form of an internal combustion engine 1 of a motor vehicle, comprising an atmosphere-side suction inlet 2a for air under atmospheric pressure, and a feed line 2 for the operating gas to the drive 1 under an operating pressure, the operating gas which is conducted to the drive 1 comprising at least part of the air which is sucked in.

In a first operating type according to FIG. 3, at least part, but preferably the entire quantity, of the operating gas is conducted upstream of the drive 1 through a turbomachine 3 which comprises an electric generator 4.

The turbomachine 3 is operated in a second operating type according to FIG. 4 as a compressor for the operating gas.

An actuable valve arrangement 5 is provided in the system, by means of which valve arrangement 5 the operating gas stream can be controlled.

In a first position of the valve arrangement 5 according to FIG. 3, at least part of the air which is sucked in is conducted in a turbine direction T through the turbomachine 3.

In a second position of the valve arrangement 5 according to FIG. 4, at least part of the air which is sucked in is conducted in a reversed compressor direction V through the turbomachine 3.

In a third position of the valve arrangement 5 according to FIG. 5, no operating gas flows through the turbomachine. The operating gas stream is conducted past the turbomachine 3.

Depending on the operating type, the valve arrangement 5 can also act as a throttle valve with an adjustable cross section for the drive.

The rotational direction of the electric generator 4 runs in an opposed manner in the two operating types. This allows a simple realization, the generator 4 and a compressor wheel and/or turbine wheel 6 being attached on the same shaft 7 in the present case. In the case of a change of the operating types, the generator or motor 4 is first of all brought to a standstill and is then accelerated again in the opposite rotational direction.

In the case of alternative embodiments (not shown), a reversing gear mechanism can also be provided, with the result that the generator or motor 4 always rotates in the same direction. As a result, a torque in the case of a change of the operating type can be decreased.

The generator 4 is generally advantageously switched in the second operating type as an electric motor of the turbomachine 3 by means of control electronics 8. This allows the use of the same moving masses both as a generator and as a motor 4.

In the case of alternative embodiments (not shown), however, a separate motor and generator can also be provided, preferably on the same shaft 7.

In order to reduce the number of components and in the interests of a compact overall design, the valve arrangement 5 in the present case comprises a multiway valve. In the embodiment which is shown, the valve arrangement consists completely of a multiway valve 5. In the present case, the multiway valve 5 comprises only a single valve slide, by way of which the flow paths of the various operating types are achieved.

In the present case, the turbomachine comprises precisely one turbomachine wheel 6, the wheel 6 acting as a turbine or as a compressor for the operating gas depending on the operating type. This allows inexpensive and simple production.

In the case of alternative embodiments (not shown), however, a plurality of wheels can also be provided. For example, said wheels can be flowed through one after another, in order, for example, to increase the turbomachine efficiency. Depending on the requirements, only the throughflow of one of the wheels can also be provided in one of the operating types, for example the first operating type, whereas two or more wheels are flowed through in the second operating type.

In the first operating type according to FIG. 3, the wheel 6 acts as a turbine wheel. Here, the operating gas first of all flows in a first channel 9 to the turbine wheel 6, where it enters into a radially outer region of a housing 10 of the turbine wheel 6. After the throughflow and driving of the turbine wheel 6 under expansion, the operating gas passes into a central region and in the axial direction out of the housing 10 into a second channel 11. The second channel 11 is connected by the valve arrangement 5 to the feed line 2, with the result that the expanded operating gas is conducted to the drive 1. The generator 4 is driven by the shaft 7 by way of the energy output in the case of expansion of the operating gas, and electric energy is generated or is converted from mechanical energy. The electric energy is fed to an energy store (not shown) of the motor vehicle. The flow direction of the operating gas through the turbomachine 3 is the turbine direction T in this operating type.

In the second operating type according to FIG. 4, the same wheel 6 acts as a compressor wheel. Here, in the case of a correspondingly different position of the valve arrangement 4, the operating gas first of all flows in the second channel 11 to the compressor wheel 6, where it enters into the central region of the housing 10 in the axial direction of the wheel 6. The generator 4 is then switched as a motor via the control electronics 8, and drives the shaft 7 and the compressor wheel 6. In the case of the throughflow of the wheel 6, the operating gas is correspondingly compressed, and then passes out of the radially outer region of the housing 10. From there, it is conducted via the first channel 9 via the valve arrangement 5 to the feed line 2 and the drive 1. The flow direction of the operating gas through the turbomachine 3 is the compressor direction V in this operating type. The compressor direction V and the turbine direction T are reversed or opposed.

A third operating type is shown in FIG. 5. Here, the valve arrangement 5 is set in such a way that the operating gas does not flow through the turbomachine 3 or the wheel 6 at all and/or bypasses it in the manner of a bypass.

In the present case, the turbomachine 3 is a turbine of radial design. Turbines of this type can be optimized satisfactorily, in particular, in conjunction with internal combustion engines. Here, the wheel 6 in the housing 10 is configured as a radial turbine or as a radial compressor. This means that the operating gas flows at the inlet (first operating type) or at the outlet (second operating type) substantially perpendicularly with respect to an axis of the wheel 6 or the shaft 7.

Figure 2:
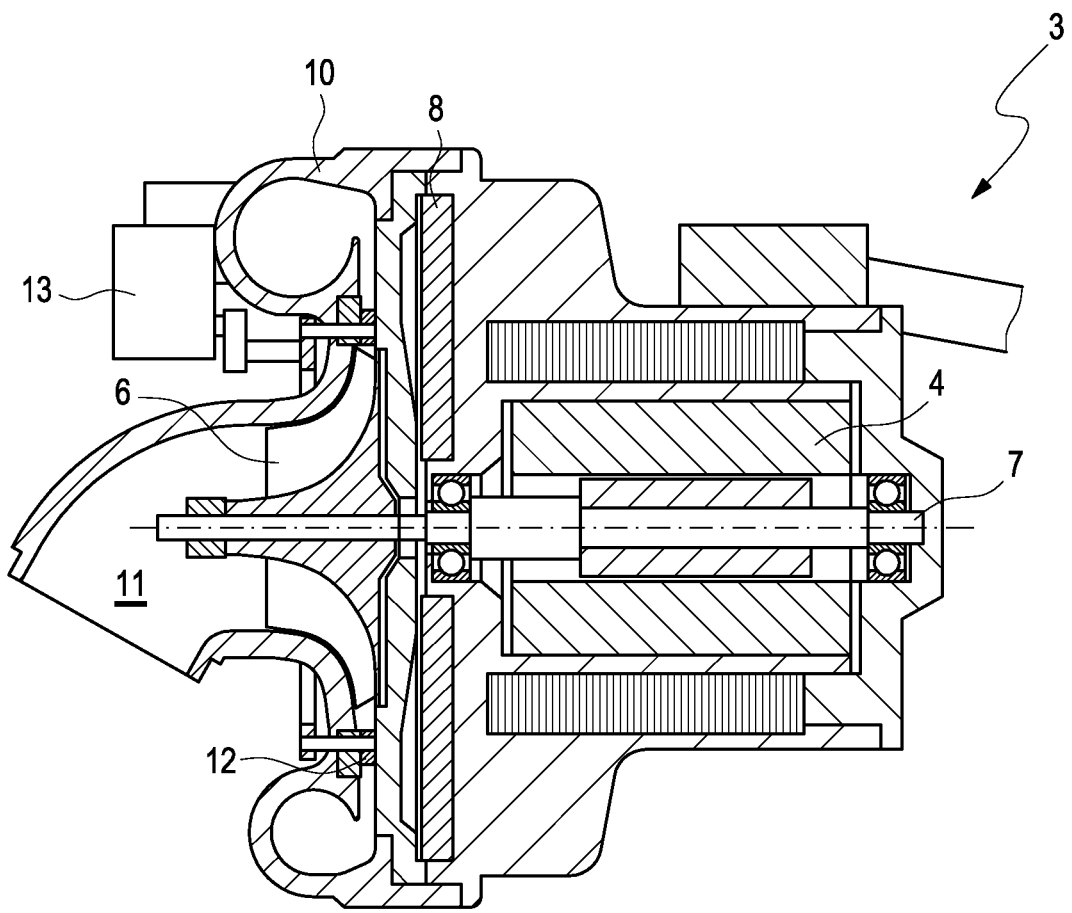
FIG. 2 shows a diagrammatic sectional view of a turbomachine of a system according to the invention.

For the turbomachine optimization, it is provided that the turbomachine 3 comprises adjustable guide vanes 12 (see FIG. 2). This allows a particularly satisfactory optimization. As a result, in particular, the adaptation to the various operating modes of the internal combustion engine 1 can be improved, which requires different mass flows of the operating gas depending on the operating point. Here, the guide vanes 12 make more efficient gas conducting to the rotor blades of the turbine possible than would be possible in the case of pressure-side throttling via the valve 5, and a simultaneous mass flow regulation of the engine. At the same time, they serve in compressor operation as discharge guide vanes which likewise make an efficiency increase possible. The use of adjustable guide vanes 12 is also known under the term "VTG"=Variable Turbine Geometry from the construction of turbochargers for motor vehicles. The adjustable guide vanes 12 are adjusted by means of an actuable actuator 13.

As an alternative to this, it can also be provided that the turbomachine 3 has stationary guide vanes. Guide vanes of this type are inexpensive to produce and nevertheless allow an increase in the efficiency, but no regulation of the overall mass flow of the internal combustion engine 1.

In the present case, the drive is configured as an internal combustion engine 1. In particular, internal combustion engines have a pressure drop in many operating states, for example in part load operation E, which pressure drop is suitable for turbomachine recuperation. In terms of the design, the present turbomachine 3 is largely an electrically driven compressor, as is used, for example, under the designation "eBOOSTER", in order to supercharge the operating gas or the air which is sucked in. According to the invention, a module of this type can at the same time be used in conjunction with the valve arrangement 5 as a turbine for recuperation. To this end, at most small modifications are required. They relate firstly to the electronic circuitry which, in addition to motor operation (second operating type in the context of the invention), also makes generator operation (first operating type in the context of the invention) possible.

In addition, in the present exemplary embodiment, an exhaust gas turbocharger 14 is provided in addition to the turbomachine 3. The exhaust gas turbocharger 14 makes an optimization of the degree of efficiency of the overall system possible, by utilizing energy which is contained in the exhaust gas for supercharging the internal combustion engine. Here, the exhaust gas turbocharger 14 is a separate component with a dedicated turbine wheel and compressor wheel.

The additional exhaust gas turbocharger 14 supercharges the operating gas or the air which is sucked in in the third operating type according to FIG. 3. Said third operating type corresponds, in particular, to operation at a high constant load (range D in FIG. 1) or else at a constant full load (line C in FIG. 1).

In the case of one embodiment of the invention (not shown) which is an alternative to this, no further compressor, in particular no exhaust gas turbocharger 14, is provided in addition to the turbomachine 3. This allows cost savings and a reduction of components. Here, the turbomachine 3 can fundamentally act as an electrically driven compressor or supercharger which acts permanently in load operation (supercharging operation, range D in FIG. 1). As an alternative, the turbomachine can also act merely temporarily as a supercharger, in order to make short peak loads possible, for example in the case of acceleration, with the result that the internal combustion engine 1 is operated as a normally aspirated engine in the case of normal load. The design of a system of this type can be adapted depending on requirements.

It is provided in the case of a further possible embodiment of the invention (not shown) that the turbomachine 3 comprises a turbine wheel which is driven by way of exhaust gas of the internal combustion engine 1. Here, the exhaust gas turbine wheel can be arranged on the same shaft 7 as the generator 4. In the simplest structural variant, the turbomachine therefore comprises an operating gas-side wheel which, depending on the operating type, is flowed through as an operating gas-side compressor wheel or operating gas-side turbine wheel 6, an electric motor 4 which, depending on the operating type, can also be operated as an electric generator 4, and an exhaust gas-side turbine wheel. Said components can all be arranged on the same shaft.

It is then to be taken into consideration in the first operating type that the exhaust gas-side turbine wheel does not have a braking action on the turbomachine 3. To this end, the exhaust gas-side turbine wheel can be switched to be free of flow or to idle outside the exhaust gas stream. As an alternative or in addition, a releasable clutch can be provided on a common shaft 7. Once again as an alternative or in addition, a reversing gear mechanism can be provided. For example, the generator or motor and the exhaust gas-side turbine wheel can always rotate in the same direction by means of the reversing gear mechanism, whereas only the rotational direction of an operating gas-side compressor wheel/turbine wheel 6 reverses depending on the operating type.

It is generally advantageously provided for all of the described exemplary embodiments that the operating pressure in at least one regular operating state, preferably a part load range E of the drive 1, is smaller by a differential pressure than the atmospheric pressure. This allows, for example, operation as a normally aspirated engine or else a design in conjunction with an exhaust gas turbocharger 14 in the case of a low power output. In the case of a design of this type of the system, the turbomachine in the first operating type is designed in such a way that there is a satisfactory efficiency for a throughflow on the basis of a pressure gradient toward a subatmospheric pressure on the outlet side of the turbomachine in turbine operation.

Figure 6:
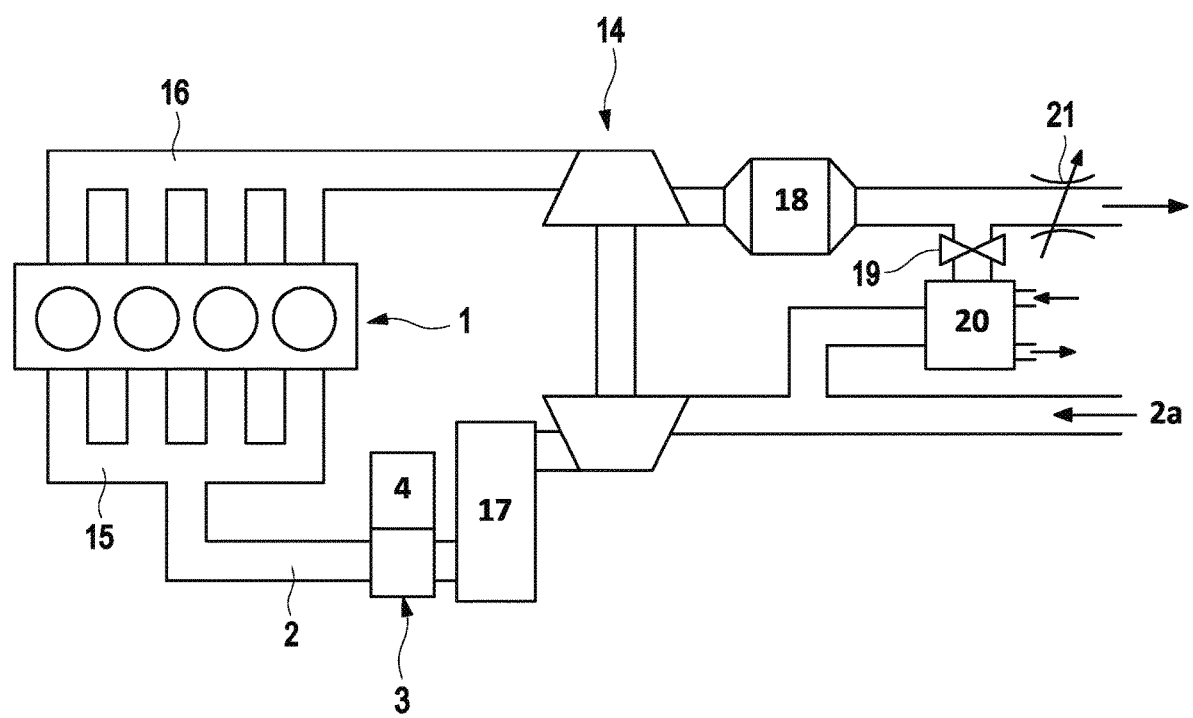
FIG. 6 shows a diagrammatic overall illustration of a system according to the invention.

For illustrative purposes, FIG. 6 shows an overall illustration of a system according to the invention. The internal combustion engine 1 with an intake manifold 15 and an exhaust manifold 16 is installed in a motor vehicle (not shown). The internal combustion engine 1 is preferably a gasoline engine.

In the present case, the turbomachine 3 is arranged downstream of an intercooler 17. In the case of other embodiments, the turbomachine can also be provided upstream, in particular directly upstream, of the intercooler 17.

In the present diagrammatic illustration, an operating gas-side throttle valve is of integrated configuration with the turbomachine 3, and is therefore not shown separately. Depending on requirements, however, a throttle valve can also be provided as a separate component, for example in a branch channeled to the turbomachine 3.

The exhaust gas turbocharger 14 is arranged on the turbine side upstream of an exhaust gas purification means with a catalytic converter 18. An exhaust gas recirculation means with an exhaust gas recirculation valve 19, an exhaust gas cooler 20 and an exhaust gas throttle valve 21 is provided downstream of the catalytic converter 18.

It goes without saying that, depending on requirements, other or additional components and/or connections of the gas streams can be provided in the system. Examples are catalytic converters of various designs, a high pressure exhaust gas recirculation means or the like.

LIST OF DESIGNATIONS

1 Drive, internal combustion engine
2 Feed line for operating gas
2a Suction inlet under atmospheric pressure
3 Turbomachine
4 Generator, electric motor
5 Valve arrangement
6 Turbomachine wheel, compressor wheel and/or turbine wheel
7 Shaft
8 Control electronics
9 First channel of the turbomachine
10 Housing of compressor wheel and/or turbine wheel
11 Second channel of the turbomachine
12 Adjustable guide vanes
13 Actuator for guide vanes
14 Exhaust gas turbocharger
15 Intake manifold
16 Exhaust manifold
17 Intercooler
18 Catalytic converter
19 Exhaust gas recirculation valve
20 Exhaust gas cooler
21 Exhaust gas throttle valve
A Range, normally aspirated operation (normally aspirated engine part load)
B Maximum power output line, normally aspirated operation
C Maximum power output line, supercharged operation
D Range, supercharged operation
E Region for expansion/recuperation
T Turbine direction
V Compressor direction

What is claimed:

1. A system for feeding operating gas to a drive (1) of a motor vehicle, comprising:
   an atmosphere-side suction inlet (2a) for air under atmospheric pressure; and
   a feed line (2) for the operating gas to the drive (1) under an operating pressure,
   the operating gas which is conducted to the drive comprising at least part of the air which is sucked in,
   at least part of the operating gas being conducted through a turbomachine (3) upstream of the drive (1) in a first operating type;
   the turbomachine (3) comprising an electric generator (4), and
   the turbomachine (3) being operated in a second operating type as a compressor for the operating gas,
   wherein
   an actuable valve arrangement (5) is provided,
   at least part of the air which is sucked in being conducted in a turbine direction (T) through the turbomachine (3) in a first position of the actuable valve arrangement (5), and
   at least part of the air which is sucked in being conducted in a reversed compressor direction (V) through the turbomachine (3) in a second position of the actuable valve arrangement (5) and
   wherein the actuable valve arrangement (5) comprises a multiway valve, and
   wherein the turbomachine (3) comprises a turbine of radial design, and
   wherein the operating pressure in at least one regular operating state is smaller by a differential pressure than the atmospheric pressure, and
   wherein the drive (1) is configured as an internal combustion engine, and
   wherein no further compressor is provided in addition to the turbomachine (3) for feeding the operating gas to the engine.

2. The system as claimed in claim 1, wherein the rotational direction of the electric generator (4) runs in an opposed manner in the first and second operating types.

3. The system as claimed in claim 1, wherein the generator (4) is switched as an electric motor (4) of the turbomachine (3) by means of control electronics (8) in the second operating type.

4. The system as claimed in claim 1, wherein the turbomachine (3) comprises precisely one turbomachine wheel (6), the wheel (6) acting as a turbine or as a compressor for the operating gas depending on the operating type.

5. The system as claimed in claim 1, wherein the turbomachine (3) comprises a turbine wheel which is driven by way of exhaust gas of the internal combustion engine (1).

6. The system as claimed in claim 1, wherein the operating pressure in a part load range of the drive (1) is smaller by the differential pressure than the atmospheric pressure.

7. The system as claimed in claim 1, wherein the turbomachine (3) has stationary guide vanes.

8. The system as claimed in claim 1, wherein the turbomachine (3) comprises adjustable guide vanes (12).

* * * * *